Oct. 8, 1963    A. B. BROERMAN    3,106,096
FLUID SAMPLING SYSTEM AND PROCESS
Filed Nov. 21, 1960
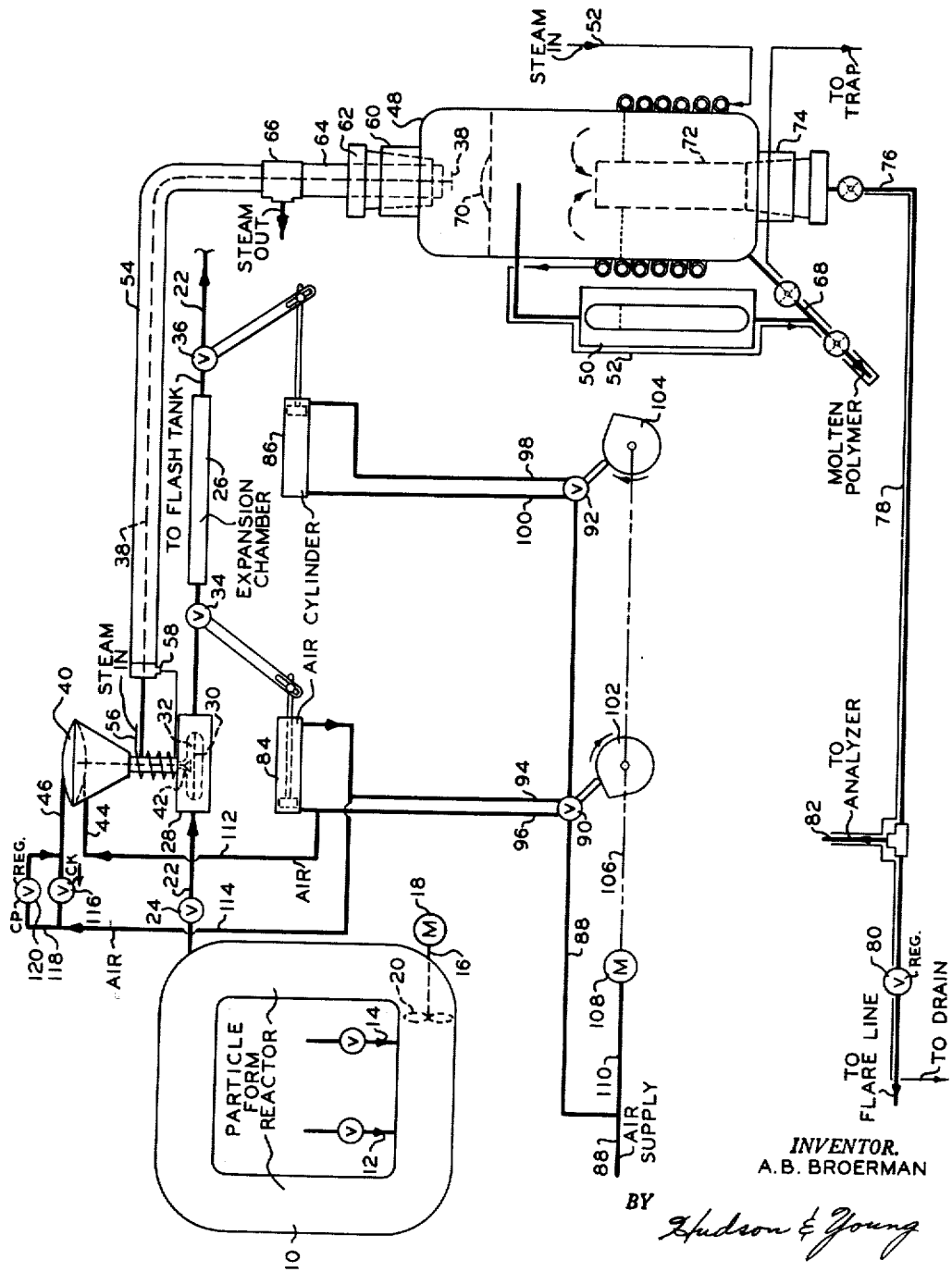
INVENTOR.
A.B. BROERMAN
BY
Hudson & Young
ATTORNEYS

United States Patent Office 3,106,096
Patented Oct. 8, 1963

3,106,096
FLUID SAMPLING SYSTEM AND PROCESS
Arthur B. Broerman, Bartlesville, Okla., assignor to Phillips Petroleum Company, a corporation of Delaware
Filed Nov. 21, 1960, Ser. No. 70,517
14 Claims. (Cl. 73—422)

This invention relates to a process and apparatus for obtaining a fluid sample from a stream containing solid particles in suspension in at least one liquid of lower specific gravity than the solids. A specific aspect of the invention is concerned with a process and apparatus for obtaining a fluid sample from such a stream comprising solid particulate polymer suspended in a liquid hydrocarbon stream.

The patent to Hogan and Banks, 2,825,721 discloses a process for polymerizing various 1-olefins in contact with a chromium oxide catalyst deposited on a carrier comprising at least one of the group silica, alumina, zirconia, and thoria to obtain solid polymer. The polymerization is effected with the catalyst dispersed in a hydrocarbon diluent and dispersant such as a paraffinic or naphthenic hydrocarbon. The 1-olefin is maintained in solution in the diluent by application of suitable pressure. When polymerizing ethylene and mixtures of ethylene with other unsaturated hydrocarbons, copolymerizable therewith, in the presence of a suspension of chromium oxide-containing catalyst in the diluent at temperatures below about 230° F., when the diluent is paraffinic hydrocarbon, and below about 190° F., when the diluent is a naphthenic hydrocarbon, the polymer produced is in the form of solid particles, insoluble in the diluent, substantially non-tacky, and non-agglutinative. The effluent from a particle form process or reactor comprises a stream of liquid diluent containing the particle form polymer in suspension therein. There is also a minor proportion of liquid polymer in solution in the diluent when operating under some conditions.

In controlling the reaction conditions in a polymerization process, it is conventional to sample the effluent from the process continuously or periodically, pass the sample to an instrument designed to analyze the same, and control one of the variables in the process in response to the analysis of the sample. Such instruments as infrared analyzers, differential refractometers, ultraviolet spectrophotometers, mass spectrometers, and chromatographic analyzers, all of which are conventional instruments, have been utilized in various ways to analyze liquid or vapor streams recovered as samples from the effluent from a chemical process and to control the process.

Because of the presence of the polymer in solid particulate form in the effluent from a particle form polymerization process or reactor, the recovery of a fluid sample without solid particles therein poses a special problem. This invention is concerned with a method and apparatus for recovering a total fluids sample from such an effluent and converting the same to a continuous-flow vapor sample for passing a portion thereof to a suitable analyzer used in controlling the particle form polymerization process.

Accordingly, it is an object of the invention to provide a process and apparatus for obtaining a total fluids sample from a stream containing particulate solids in suspension in a liquid lighter than the solids. Another object is to provide a process and apparatus for obtaining from a stream containing particle-form solid polymer in suspension in at least one liquid hydrocarbon, a total fluids sample and converging same to vapor form for gas analysis. A further object is to obtain from such a stream as just described, a sample fluid stream substantially free of solids for analysis in a suitable analyzing instrument. Other objects of the invention will become apparent upon consideration of the accompanying disclosure.

A broad aspect of the process comprises passing an effluent stream containing particle form solids in suspension in a liquid lighter than the solids thru a vertically expanded zone in a generally horizontal section of conduit; stopping flow of the stream at a point downstream of the expanded zone so as to provide quiescent conditions in said zone to cause solids to settle to the lowermost section thereof; withdrawing a liquid, solids-free sample from the uppermost section of said zone while the solids are settled therein; and thereafter continuing the flow of the stream thru the conduit to conventional separation steps. The foregoing steps are repeated at frequent intervals so that continuous sampling is effected and the samples are passed in liquid form to a vaporization zone maintained under substantially less pressure than in the effluent conduit, whereby the liquid of the samples is vaporized and withdrawn in a continuous stream for passage of a portion thereof continuously or at selective intervals thru a gas analyzer.

One aspect of the invention comprises an arrangement of apparatus or a sampling system for obtaining a total fluids sample in accordance with the aforesaid process. The apparatus comprises a conduit for carrying a stream containing suspended solids in a liquid; a vertically expanded sampling vessel in a horizontal section of said conduit; an expansion chamber in said conduit downstream of said vessel; a first valve in said conduit intermediate said chamber and said vessel; a second valve in said conduit downstream of said chamber; a line leading from the uppermost section of said sampling vessel having a motor valve therein; first means for simultaneously opening said first valve and closing said second valve and periodically reversing the position of these valves to admit fluid and particulate solids in said line under flow into and out of said expansion chamber; and second means for opening said motor valve to flow upon closing of said first valve and closing said motor valve to flow upon closing of said first valve and closing motor valve to flow upon opening of said first valve. The apparatus includes a flash pot on the downstream end of the effluent conduit having an effluent line in the lowermost section for residual liquid and an effluent line from the upper vapor section for providing a continuous gas sample. In a preferred embodiment, the valves upstream and downstream of the expansion chamber are synchronously operated by air cylinders so that when one valve is opened the other is closed and vice versa. The operation of the motor valve in the sampling vessel, or in the line leading therefrom, is synchronously operated with the valve upstream of the expansion chamber so that it is opened when this valve is closed and closed when this valve is open. This operation is accomplished by connecting the air feed lines to the operating air cylinder to opposite sides of the diaphragm of the motor valve as hereinafter described.

A more complete understanding of the invention may be had by reference to the schematic drawing which shows an arrangement of apparatus in accordance with a preferred embodiment of the invention.

Referring to the drawing, a particle form reactor 10 in the form of a loop is provided with feed lines 12 and 14 for introducing diluent, reactant, and catalyst. An impeller shaft 16 extends into the reactor and is operated by a motor 18 to rotate impeller 20. Effluent line 22 containing valve 24 connects with the loop and extends to a flash tank (not shown) for flashing off the diluent for polymer recovery. An expansion chamber 26 is positioned in conduit 22 and, upstream thereof, a sampling vessel 28 is positioned in a horizontal section of the line. In the embodiment shown, a Jergusen sight glass is utilized as the sampling vessel; however any vertically expanded vessel can be utilized. The sight glass facilitates the observation of the condition of the effluent stream from the reactor passing thru line 22. As shown, a quiescent state prevails in the sight glass and the particle form polymer 29 is shown in the liquid below line 30 with the upper part of the glass or vessel being filled with clear, solids-free diluent 32.

A first valve 34 in line 22 intermediate vessel 28 and chamber 26 serves to alternately permit flow into expansion chamber 2 and stop flow thereinto. A similar valve 36 positioned downstream of the expansion chamber alternately permits flow from the chamber and cuts off flow therefrom. An effluent conduit 38 leads from sight glass 28 and connects with the top thereof for taking off a sample from the uppermost section of this sight glass or sampling vessel. A motor valve 40 is positioned in conduit 38 so that the valve head 42 operates in a seat in the mouth of the conduit 38. Motor valve 40 is of the double action diaphragm type and is air operated by air introduced and vented thru lines 44 and 46. Line 38 leads into a flash pot 48 which is provided with a reboiler 50 both of which are steam traced by steam line 52. Line 38 is jacketed by jacket 54 and a steam line 56 traces the upstream end of conduit 38 and enters the jacket at 58. The jacket 54 extends into the mouth 60 of flash pot 48 thru a packing gland 62 and is provided with a concentric, surrounding return conduit 64 which vents into connection 66 for passing steam to trap. An effluent line 68 from the lowermost section of flash pot 50 is provided to withdraw any liquid polymer which is taken off in the sample with the diluent.

In the upper section of flash pot 48 is positioned a dispersion means 70, such as a cyclone flow impeller for dispersing the sample passing into the flash pot from line 38. An enlarged conduit 72 extends axially of the flash pot, upwardly thru the outlet 74, and connects with vapor line 76 which is traced by steam line 78 to prevent condensation of constituents of the gas sample. A back pressure regulator 80 in line 76 operates at a suitable back-pressure such as 10–40 p.s.i. A line 82 connects with line 76 upstream of back pressure regulator 80 and serves to pass a gas sample continuously or periodically, as desired, to a suitable gas analyzer such as a chromatographic analyzer (not shown).

Valve 34 is operated by air cylinder 84 and valve 36 is operated by a similar air cylinder 86. Air is supplied to these air cylinders from an air supply line 88 thru valves 90 and 92 which are of the 2-way plunger type. In the position of valve 90 shown in the drawing, air is passed into line 94 so as to force the piston in cylinder 84 to the left, thereby closing and holding valve 34 in closed position. Upon rotating valve 90 about 90° clockwise air is passed thru the valve and thru line 88 into line 96 and air from the right side of the piston in cylinder 84 is bled off thru line 94 and valve 90. Reversal of valve 90 to the position shown again introduces air to line 94 and bleeds air off thru line 96 and valve 90.

Valve 92 operates similarly to valve 90 but in the reverse manner so as to close valve 36 when valve 34 is open and vice versa. Air is similarly supplied from line 88 thru valve 92 and lines 98 and 100 to feed air into one side of the air cylinder 86 and vent air from the other side of the cylinder thru the connecting air line and valve 92.

Valves 90 and 92 are operated by cams 102 and 104 connected by linkage 106 with a suitable periodically operated motivating element such as a Gast rotary air motor 108 connected to air supply line 88 by means of line 110. This device is commercially available and there are other commercially available devices for periodically operating cams 102 and 104 in any desired sequence.

Motor valve 40 is synchronously operated with air cylinder 84 by means of a connecting air line 112 which leads from line 96 to line 44 connected with the inlet on the lower side of the motor valve diaphragm. Similarly line 46 connecting with the air inlet on the upper side of the diaphragm is connected by line 114 with line 94. With this arrangement, when air is fed thru valve 90 and line 94 into the left end of air cylinder 84 to close valve 34, air is also fed into the motor valve above the diaphragm so as to move valve head 42 downwardly away from its seat and permit the taking of a liquid sample from vessel 28 thru line 38. A short delay in the opening of valve head 42 is desirable. In order to provide a delayed action in moving valve head 42 to the open position, a check valve 116 is positioned in line 46 to prevent flow of gas thru this valve into the motor valve but allowing venting of gas therethru during the reverse action of the system. A bypass line 118 is provided around check valve 116 and a constant pressure inlet valve 120 is provided in this bypass line. Thus, when valve 34 is being closed to provide quiescent conditions in vessel 28, air from line 94 passes slowly thru line 114 and bypass line 118 to open valve head 42, thereby producing a delayed action in this valve to assure the settling of solid particles of polymer into the lower section of vessel 28. In contrast, the closing of valve head 42 on its seat upon opening of valve 34 should be as fast as possible and this is effected by providing unobstructed entry of air to the lower side of the diaphragm of valve 40 thru lines 96, 112, and 44.

The olefin feed to the process consists essentially of ethylene and may contain other unsaturated hydrocarbons in minor amounts up to 10 weight percent of the olefin feed. These other unsaturated hydrocarbons must be copolymerizable with ethylene and include propylene, butylene, etc.

The liquid hydrocarbon diluent referred to hereinabove serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule can be advantageously utilized in the practice of the instant invention. Examples of paraffins which can be used include propane, n-butane, n-pentane, isopentane, n-hexane, n-decane, 2,2,4,5 dimethylpentane (isooctane), and the like. It is to be understood that some naphthenes can be tolerated in the liquid paraffin, and that mixtures of paraffins and/or isoparaffins can be employed. Another class of hydrocarbons which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, the dimethylcyclopentanes, and the dimethylcyclohexanes. It is also within the scope of the invention to utilize mixtures of paraffinic and naphthenic hydrocarbons as the reaction medium.

When utilizing butane and higher paraffinic hydrocarbons as the reaction medium, the polymerization temperature is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

With regard to the upper temperature limits set forth hereinabove, in the case of paraffinic diluents, the temperature is approximately 230° F. and for cycloparaffinic diluents approximately 190° F. There is a very narrow temperature range or area where the transformation, i.e., from tacky, agglomerated polymer to granular polymer, takes place, and conditions can be varied so as to change the absolute upper limit slightly. However, the absolute upper limits for paraffins and cycloparaffins are approximately the temperature indicated, and at the preferred upper limits granular polymer is formed in all cases. The lower temperature limit for practicing the process of this invention is not critical, but the reaction rate is undesirably low below 150° F. and impractical below 100° F.

The catalyst used in the particle form polymerization process comprises as an essential ingredient, chromium oxide, preferably including a substantial amount of hexavalent chromium. The chromium oxide is usually associated with at least one other oxide of the group silica, alumina, zirconia, and thoria. The chromium oxide content of the catalyst is in the range of 0.1 to 10 or more weight percent and may be up to 50%, but the preferred range is from 2 to 6 weight percent expressed as elemental chromium. A preferred support for the chromium oxide catalyst is a silica-alumina composite containing a major proportion of silica and a minor proportion of alumina. The catalyst is used in the form of a relatively fine powder so that it may be easily maintained in suspension or as a slurry in the liquid hydrocarbon. The concentration of catalyst in the reaction zone can be very low such as 0.001 to 5 weight percent based upon the total amount of liquid medium in the reactor. Yields as high as 10,000 pounds of polymer per pound of catalyst have been obtained. The contact time will generally be in the range of 0.1 to 12 hours, while the pressure can range from about 100 to 700 p.s.i.

The gas sample passed to the analyzer thru line 82 contains principally diluent hydrocarbon and a minor amount of ethylene and, also, of the other unsaturated hydrocarbon, such as butylene when used in the process. The reaction conditions in the reactor may be controlled in response to the ethylene content of the gas sample, or the ratio of ethylene to butylene, when this second polymerizable hydrocarbon is included in the feed to the reactor. The analysis of the gas and control of the reactor in response to a concentration of one of the components of the gas is conventional and needs no further discussion.

Certain modifications of the invention will become apparent to those skilled in the art and the illustrative details disclosed are not to be construed as imposing unnecessary limitations on the invention.

I claim:

1. A system for taking a total fluids sample from a stream of liquid containing suspended particulate solids heavier than said liquid which comprises a line for carrying said stream; a vertically expanded sampling vessel in a horizontal section of said line; an expansion chamber in said line downstream of said sampling vessel; a first valve in said line intermediate said vessel and said chamber; a second valve in said line downstream of said chamber; an outlet in the uppermost section of said vessel; a conduit connecting with said outlet for withdrawing a liquid sample from said vessel; a third valve in said conduit adjacent said outlet for opening and closing same to flow; first means for periodically simultaneously opening said first valve and closing said second valve and then reversing the position of these valves to admit said liquid into and out of said chamber while intermittently providing a quiescent state in the liquid in said vessel to permit settling of solids therein; and second means for opening said third valve in response to closing of said first valve and closing said third valve in response to opening of said first valve.

2. A system for taking a total fluids sample from the product effluent line from a particle form polymerization reactor comprising an expansion chamber in said effluent line; a first valve in said line adjacent the upstream end of said chamber; a second valve in said line adjacent the downstream end of said chamber; an expanded sampling vessel in said line upstream of said first valve; a conduit leading from the top of said sampling vessel; a motor valve in said conduit adjacent said vessel; first means for simultaneously opening said first valve and closing said second valve and periodically reversing the position of these valves to admit fluid and particulate solids in said line to flow into and out of said expansion chamber; second means for opening said motor valve to flow upon closing of said first valve and closing said motor valve to flow upon opening of said first valve; a flash pot on the downstream end of said conduit having an outlet for molten polymer in a lower section thereof and a vapor sample effluent line leading from an intermediate section thereof; and a sample take-off line leading from said sample effluent line for connecting with gas analyzing means.

3. The system of claim 2 wherein said motor valve comprises a double-acting air operated diaphragm valve; said first valve is air operated by means comprising an air cylinder having a piston connected by linkage to said first valve, an air supply line, a two-way air valve in said supply line, a first branch air line leading from one part of said two-way air valve to one end of said air cylinder for moving said piston to open said first valve, a first air feed line leading from said first branch air line to the closing side of said diaphragm, a second branch air line leading from the other port of said air valve to the other end of said air cylinder for moving said piston to close said first valve, and a second air feed line leading from said second branch air line to the opening side of said diaphragm.

4. The system of claim 3 including a check valve in said second branch air line preventing air flow toward said motor valve and a bypass line around said check valve having a restricted flow valve therein to delay opening of said motor valve.

5. The system of claim 3 including a second two-way air valve in said air supply line; a second air cylinder connected with said second valve; separate branch air lines leading from the ports of said second two-way valve to opposite ends of said cylinder; and a rotary air motor with timing means operatively connected with said two-way valves.

6. A process for obtaining a substantially solids free fluid sample from a stream flowing under substantial pressure in a conduit containing particulate solids and at least one liquid lighter than said solids, which comprises flowing said stream thru a settling zone in said conduit; stopping the flow of said stream thru said zone so as to provide quiescent conditions in said zone whereby said solids settle to the lowermost section thereof; while said solids are settled, withdrawing a liquid solids-free sample from the uppermost section of said zone; thereafter continuing the flow of said stream thru said conduit; repeating the flow stopping and liquid sampling steps; passing said liquid sample to a vaporization zone; and vaporizing a substantial portion of said liquid sample to provide a gaseous sample for analysis.

7. The process of claim 6 wherein said stream comprises particulate solid polymer of at least one 1-olefin, liquid hydrocarbon, and liquid polymer dissolved in said hydrocarbon.

8. The process of claim 7 including the steps of passing said liquid to a vaporization zone, vaporizing the hydrocarbon fraction of said sample to leave liquid polymer as bottoms, and recovering at least a portion of the vaporized sample for analysis.

9. A process for obtaining a substantially solids-free, fluid sample from a polymerization reactor producing particle form polymer from at least one 1-olefin from which a product stream is flowing under substantial pressure containing solid particulate polymer, liquid polymer, and liquid hydrocarbon diluent, which comprises the steps of (1) flowing said stream thru a conduit containing a settling zone and an expansion chamber downstream of said zone; (2) periodically closing said conduit intermediate said zone and said chamber and opening said conduit to flow downstream of said chamber to a flash tank to recover solid polymer, whereby solid polymer in said zone settles to the lowermost section thereof and leaves solids-free liquid in the uppermost section thereof; (3) withdrawing a sample of said liquid from said uppermost section while said conduit is closed; (4) thereafter closing said conduit downstream of said chamber and opening same upstream thereof; and (5) repeating steps 2, 3, and 4.

10. The process of claim 9 including the further steps of (1) taking samples at frequent intervals, (2) passing said samples to a vaporization zone; (3) continuously withdrawing vaporized sample; (4) passing a portion of said vaporized sample to a chromatographic analyzer to obtain a signal suitable for controlling operation of said reactor and (5) withdrawing liquid polymer from the bottom of said vaporization zone.

11. A process for obtaining a substantially solids-free, fluid sample from a polymerization reactor producing particle form polymer from at least one 1-olefin from which a product stream is flowing under substantial pressure containing solid particulate polymer, liquid polymer, and liquid hydrocarbon diluent, which comprises the steps of (1) flowing said stream thru a settling zone and an expansion chamber downstream of said zone; (2) terminating flow of said stream intermediate said zone and said chamber so as to produce quiescence and solids settling in said zone; (3) while flow is terminated as aforesaid, continuing flow from said chamber to a flash tank to recover solid polymer from said stream; (4) withdrawing a solids-free liquid sample from the uppermost section of said settling zone while quiescent; (5) thereafter continuing the flow of said stream from said zone to said chamber and terminating flow from said chamber to said tank; and (6) repeating steps 2, 3, 4, and 5.

12. A system for taking a total fluids sample from a stream of liquid containing entrained particulate solids heavier than said liquid which comprises a line for carrying said stream; first means in said line for trapping a quiescent sample of said stream and settling solids therefrom; second means connected with said first means for withdrawing a solids-free liquid sample from said first means during quiescence; and third means in said line downstream of said first means for expanding said stream during quiescence in said first means.

13. The system of claim 12 including fourth means for vaporizing a portion of the liquid from said sample and leaving an unvaporized liquid portion.

14. The system of claim 12 including fourth means in said line downstream of said third means for separating said liquid in vapor form from solids in said stream.

References Cited in the file of this patent

UNITED STATES PATENTS

| | | |
|---|---|---|
| 1,164,527 | Kelly | Dec. 14, 1915 |
| 2,183,338 | Slough | Dec. 12, 1939 |

OTHER REFERENCES

Gas Chromatography in Plant Streams, by D. H. Fuller, I.S.A. Journal, November 1956, vol. 3, No. 11, pages 440 to 444 (only pages 441 and 442 pertinent). (Photocopy in Div. 36.)

UNITED STATES PATENT OFFICE
CERTIFICATE OF CORRECTION

Patent No. 3,106,096 October 8, 1963

Arthur B. Broerman

It is hereby certified that error appears in the above numbered patent requiring correction and that the said Letters Patent should read as corrected below.

Column 6, line 35, for "part" read -- port --.

Signed and sealed this 21st day of April 1964.

(SEAL)
Attest:
ERNEST W. SWIDER

Attesting Officer

EDWARD J. BRENNER
Commissioner of Patents